United States Patent
Swerdlow et al.

(10) Patent No.: US 9,898,613 B1
(45) Date of Patent: Feb. 20, 2018

(54) CROWDSOURCING PRIVACY SETTINGS

(71) Applicant: Google Inc., Mountain View, CA (US)

(72) Inventors: Andrew Swerdlow, San Francisco, CA (US); Peter Klein, San Francisco, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 13/733,735

(22) Filed: Jan. 3, 2013

(51) Int. Cl.
*H04L 29/00* (2006.01)
*G06F 21/62* (2013.01)

(52) U.S. Cl.
CPC .................................. *G06F 21/62* (2013.01)

(58) Field of Classification Search
None
See application file for complete search history.

(56) References Cited

U.S. PATENT DOCUMENTS

2010/0023584 A1\* 1/2010 Kamdar et al. ............... 709/206
2011/0029566 A1\* 2/2011 Grandison et al. ........... 707/783

\* cited by examiner

*Primary Examiner* — Edward Zee
*Assistant Examiner* — Leynna Truvan
(74) *Attorney, Agent, or Firm* — McDermott Will & Emery LLP (57) ABSTRACT

The disclosed subject matter relates to a computer-implemented method including steps for aggregating privacy setting information for one or more networking associates, generating data based on the aggregated privacy setting information and providing a privacy setting recommendation for display to a user based on the data. Systems and computer-readable media are also provided.

19 Claims, 4 Drawing Sheets

CROWDSOURCING PRIVACY SETTINGS

BACKGROUND

The disclosed subject matter provides a method for aiding in the configuration of user-selectable privacy settings and in particular, providing privacy recommendations based on aggregated privacy setting information for multiple social networking users.

Various social networking services provide user configurable privacy settings that enable users to control the sharing of personal information. Privacy settings can be used to control access to a user's personal information in a number of ways. For example, privacy settings can be configured to control the types of user information that are shared with a user's social networking contacts and/or other users of the same social network (i.e., "networking associates"). Privacy settings can also be used to restrict access to user information based on pre-defined relationship criteria. For example, a user may allow/disallow the sharing of information with certain networking associates, or groups of networking associates, based on the type of relationship shared with the user.

SUMMARY

The disclosed subject matter relates to a computer-implemented method for providing privacy setting information to a user, comprising, aggregating privacy setting information for one or more networking associates, generating statistical data based on the aggregated privacy setting information and providing the statistical data for display to a user, in association with user configurable privacy controls.

In some implementations, the method may further comprise displaying a privacy setting recommendation to the user based on the statistical data, wherein the privacy setting recommendation comprises an indication of privacy settings selected by at least one of the one or more networking associates. In certain aspects, generating the statistical data may be further based on a comparison of a profile of the user with one or more profiles of the one or more networking associates, wherein the one or more networking associates are social networking contacts of the user. In some aspects, the one or more networking associates may share common demographic information with the user. Furthermore, in some implementations, statistical data provided for display to the user can be based on a relationship between the user and at least one of the one or more networking associates.

The disclosed subject matter also relates to a system for providing privacy setting information to a user, the system comprising one or more processors and a computer-readable medium comprising instructions stored therein, which when executed by the processors, cause the processors to perform operations comprising aggregating privacy setting information for one or more networking associates, generating statistical data based on the aggregated privacy setting information and providing the statistical data for display to a user, in association with user configurable privacy controls. In certain aspects, the processors are further configured to execute instructions for displaying a privacy setting recommendation to the user based on the statistical data.

In certain implementations, the privacy setting recommendation may comprise an indication of privacy settings selected by at least one of the one or more networking associates. In some aspects, generating the statistical data is further based on a comparison of a profile of the user with one or more profiles of the one or more networking associates. In certain aspects, the one or more networking associates are social networking contacts of the user and/or may share common demographic information with the user. Furthermore, in some aspects, providing the statistical data for display to the user may be based on a relationship between the user and at least one of the one or more networking associates.

The disclosed subject matter also relates to a computer-readable medium comprising instructions stored therein, which when executed by a processor, cause the processor to perform operations comprising, aggregating privacy setting information for one or more networking associates, generating statistical data based on the aggregated privacy setting information and providing the statistical data for display to a user, in association with user configurable privacy controls, wherein the statistical data comprises a privacy setting recommendation for the user.

In certain implementations, the privacy setting recommendation can comprise an indication of privacy settings selected by at least one of the one or more networking associates. In some aspects, generating the statistical data can be further based on a comparison of a profile of the user with one or more profiles of the one or more networking associates. In certain aspects, the one or more networking associates are social networking contacts of the user and/or share common demographic information with the user. In some implementations, providing the statistical data for display to the user is based on a relationship between the user and at least one of the one or more networking associates. Furthermore, in some implementations the privacy setting recommendation is displayed proximate to one or more of the user configurable privacy controls.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Because of the numerous ways in which privacy settings can be customized, it is often difficult for users to determine what settings most accurately embody their own privacy preferences. However, privacy preferences amongst similar users are often highly correlated. That is, the privacy choices of a particular user are often closely tracked by the choices of similarly situated networking associates, for example, networking associates sharing similar interests and/or demographic information with the user.

The subject technology provides a way to make privacy recommendations by providing a user with information (e.g., "statistical data") regarding privacy choices of the user's networking associates. As used herein, "networking associates" can refer to any members or group of members in a social network. In some aspects, "networking associates" refers to social networking members that are affiliated with a particular user in a social network.

Statistical data that is provided to the user can be based on privacy settings selected by any individual, group or subgroup of networking associates in the social network. In certain aspects, the statistical data provided to the user will represent privacy choices made by networking associates affiliated with and/or sharing similarities with, the user. In such instances, the statistical data can serve as a privacy guideline (or used to provided recommendations) to help the user in making privacy setting selections that are informed by the choices of similarly situated networking associates.

It is understood that any statistical data and/or privacy setting recommendations derived from the privacy settings of one or more networking associates will be subject to the privacy choices of the one or more networking associates. In certain implementations, a networking associate will be required to provide an indication that information regarding his/her privacy selections may be shared with other users. Thus, the privacy settings of any particular networking associate may not be used to provide data or privacy setting recommendations to any user, unless the networking associate explicitly allows his/her privacy settings to be used in this manner. In another aspect, networking associates may be able to specify certain users or groups of users with whom their privacy selections may be shared, either directly or provided as aggregated statistical data or privacy setting recommendations.

In certain implementations, statistical data or privacy setting recommendation information provided to a user about a particular group of networking associates will require the inclusion of a minimal number of networking associates in the group. By requiring a group having a minimal size, the privacy settings or preferences of any individual networking associate in the group may be further obscured.

Figure 1:
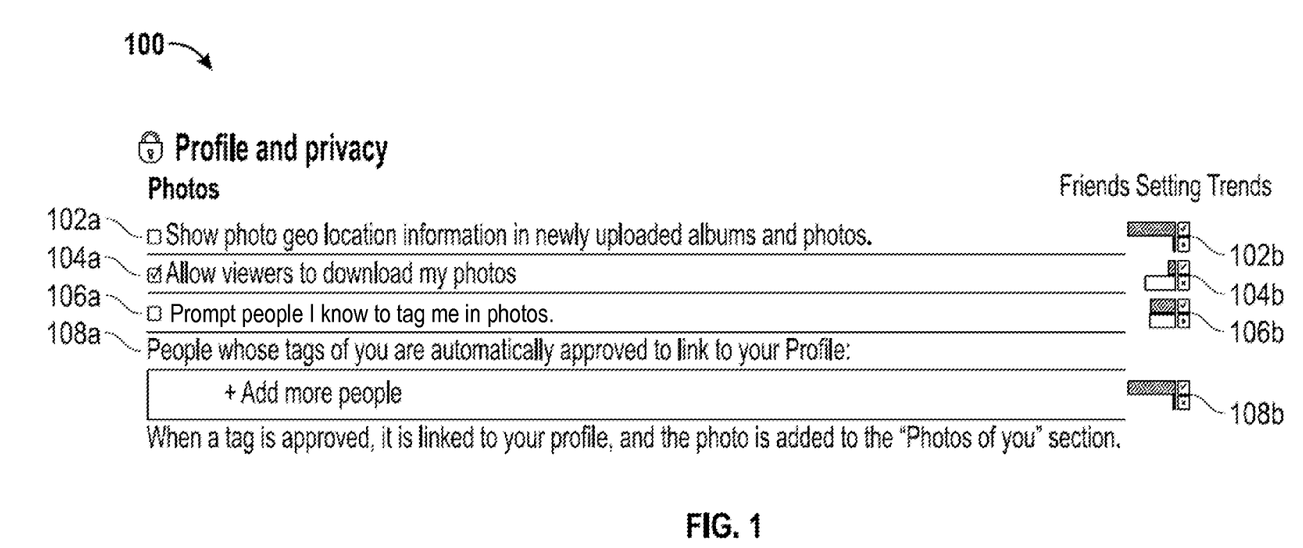
FIG. 1 illustrates an example user interface for providing privacy setting recommendations to a user, according to some aspects of the subject disclosure.

In some implementations, statistical data regarding the privacy choices of one or more networking associates will be provided to the user in a user interface (UI), in which the statistical data is displayed to the user in conjunction with one or more selectable privacy options. FIG. 1 illustrates an example user interface 100 used to provide privacy setting recommendations to a user. Specifically, the user interface 100 depicts a "Profile and Privacy" settings menu in which privacy settings can be set with respect to a particular type of content, for example, "photos." As depicted, selectable privacy settings 102a-8a allow for the adjustment/selection of different privacy features with respect to various aspects of user information.

In the example of FIG. 1, privacy setting 102a allows the user to toggle on/off the sharing of image location information. Similarly, privacy setting 104a allows the user to select whether or not viewers of the user's profile (e.g., networking associates) are able to download the user's photographs, such as, photographs displayed in a profile of the user that is accessible through the social network. Privacy setting 106a enables the user to choose whether or not networking associates are prompted to "tag" the user in the photographs. Lastly, in privacy setting 108a, the user can optionally indicate one or more people (e.g., networking associates) whose tags (of the user) can be automatically linked to the user's profile.

User interface 100 also depicts multiple graphics 102b-108b providing statistical data regarding privacy selections that have been made by the user's "friends" or networking associates. Specifically, graphics 102b-108b of the "Friends Setting Trends" column indicates choices made by the user's social networking associates with respect to associated privacy settings 102a-108a, discussed above. For example, graphic 102b indicates that a greater number of social networking associates have enabled the sharing of image location information, as compared to those who have disallowed sharing of the same information. Graphic 104b indicates that a greater number of the user's networking associates allow viewers of their profiles to download photos, as compared to the number who do not allow downloading. With respect to privacy setting 106a, graphic 106b indicates that an approximately equal number of users both allow and disallow the ability of (other) networking associates to tag their face in photographs. Similarly, graphic 108b indicates that a significantly greater number of networking associates allow the automatic linking of photograph tags to their social networking profiles.

Although FIG. 1. illustrates privacy setting options for a user's sharing of profile information with respect to a particular type of information content (i.e., photographs) it is understood that any type of information or aspect of the user's profile may be shared via the social network. Thus the example provided by FIG. 1 is merely an illustration of a particular type of user information that may be controlled using privacy settings, however, it is understood that any type of user information may be controlled through the user's selection (or de-selection) of one or more privacy settings.

Furthermore, user interface 100 illustrates graphics for privacy data and statistics with respect to the user's "friends," such data can be provided with respect to any individual or group of networking associates, including one or more networking associates who are not personally known to the user.

In certain implementations, the user will only be provided with data and statistics that reflect the choices of networking associates whose profiles share common aspects with the user's profile. For example, privacy data and statistics may be provided for networking associates of a particular relationship type and/or for those sharing similar tastes/interests with the user, such as hobbies, sports, religion, etc. Moreover, provided privacy data and statistics can reflect privacy settings for networking associates sharing common demographic information with the user, for example, networking associates sharing a similar age, sex and/or location with the user.

It should be understood that privacy data and statistics can be provided in the form of various visual indicators and/or statistics, and are not limited to the examples provided in FIG. 1. For example, privacy data and statistics can be displayed to the user together with user selectable privacy settings, such as privacy settings 102a-110a, as illustrated with respect to FIG. 1. In other implementations, privacy data and/or statistics will only be provided at particular times or in relation to specific user tasks. For example, privacy data and/or statistics can be provided during the initial setup of the user's social networking account and/or provided in relation to detected changes in the user's privacy settings.

Figure 2:
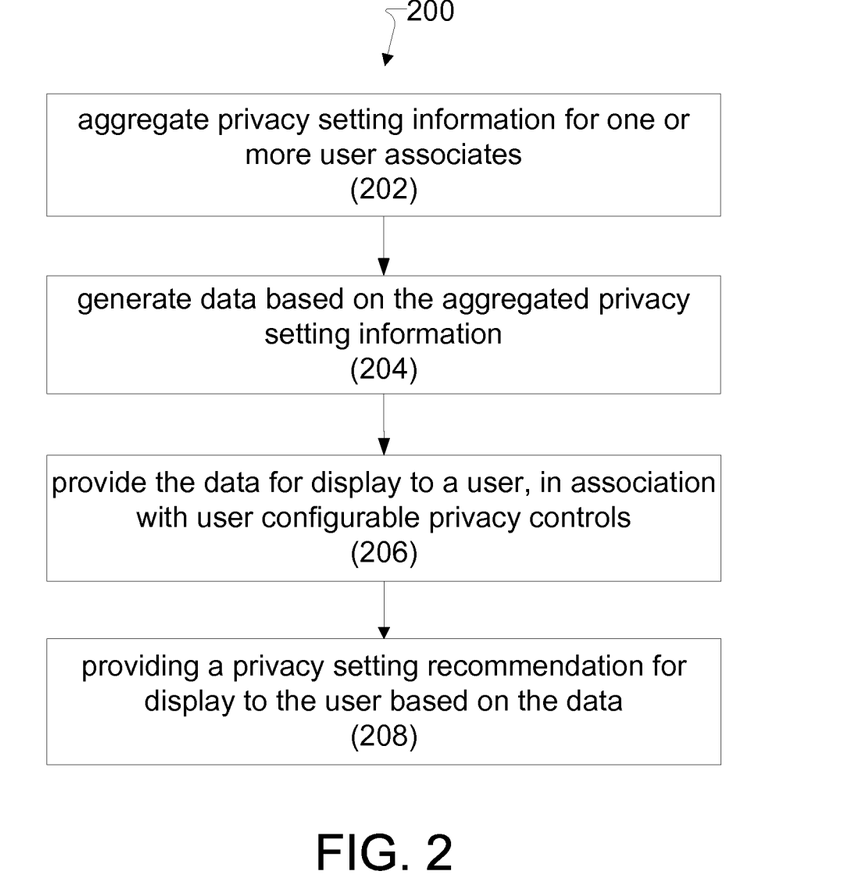
FIG. 2 illustrates steps of an example method for providing a privacy setting recommendation to a user, according to some aspects of the subject disclosure.

FIG. 2 illustrates steps of an example method 200 for providing a privacy setting recommendation to a user. Specifically, method 200 begins with step 202 in which privacy setting information is aggregated for one or more networking associates. The aggregation of privacy setting information can occur with respect to all networking associates of a social network, or with respect to a particular group or subset of networking associates. For example, the aggregation of privacy setting information may occur with respect to networking associates sharing common profile information with a particular user and/or with respect to networking associates that are connected or associated with the user within the social network.

In step 204, data based on the aggregated privacy setting information is generated. The data may be generated based on any measure of the privacy setting information with respect to privacy setting selections for one or more networking associates. In some implementations, data may comprise a comparison of privacy settings that were selected by a particular subset of networking associates. For example, the data may comprise statistical data reflecting a count comparison of networking associates who made a particular privacy setting selection (e.g., a count of those that enabled the sharing of photograph geo-location tags), as compared with networking associates who made a different selection (e.g., a count of those that disallow sharing of geo-location tags).

Additionally, the generation of data and/or statistical data may be based on a comparison of a profile of the user with profiles for one or more networking associates. For example, the generated data may only be based on the privacy selections of one or more networking associates having profile information that is similar to that of the user.

In step 206, the data is provided for display to a user in association with user configurable privacy controls. The data can be provided in association with user configurable privacy controls in any manner suitable for conveying information to a user. Further to the example illustrated in FIG. 1, the data may be provided as statistical data represented by a graphic, such as graphics 102b-110b, displayed adjacent to associated privacy settings 102a-110a.

In step 208, a privacy setting recommendation is displayed to the user based on the data. Although one or more privacy setting recommendations may be displayed in various manners, in some implementations privacy setting recommendations may be visually indicated as highlighted or checked privacy setting items. For example, one or more of the privacy settings 102a-110a of user interface 100 may be highlighted or checked to indicate the privacy setting recommendation based on the data described in step 206.

In some implementations, the privacy setting recommendations may be provided to the user as default settings that are set upon initialization of the user's social networking account. For example, it may be inferred that new users have a limited understanding of how to configure their privacy setting controls and as such, privacy setting recommendations can be displayed to the user based on statistical data reflecting the choices of one or more networking associates.

In certain aspects, privacy setting recommendations will be made based on statistical data related to one or more networking associates sharing common qualities or demographic information with the user. By way of example, the privacy setting recommendation may be made based on a sample of networking associates whose profiles most closely match the profile of the user, or the recommendation may provide an indication of the privacy settings selected by a particular networking associate.

Figure 3:
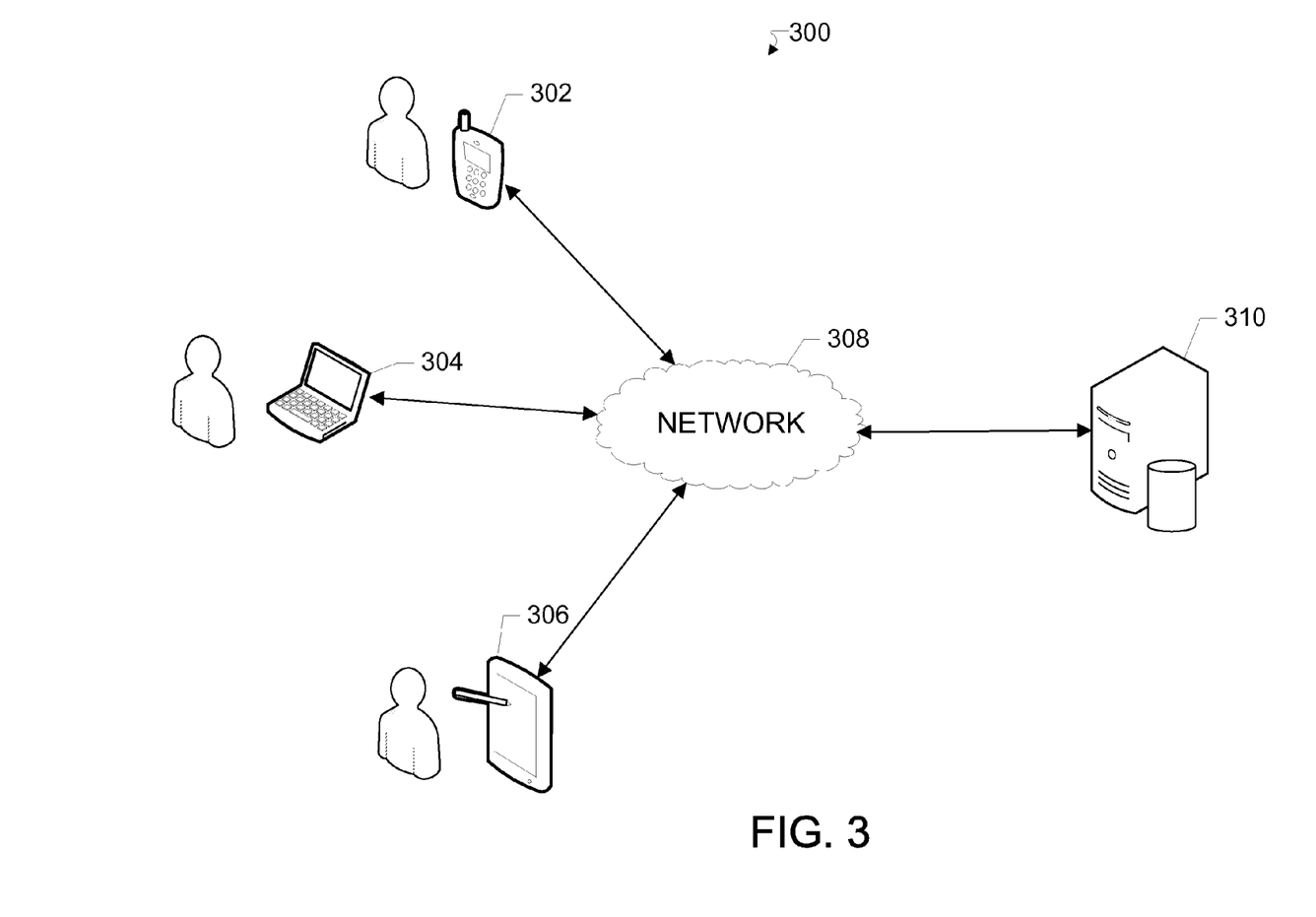
FIG. 3 conceptually illustrates an example of a network system for implementing some aspects of the subject disclosure.

FIG. 3 conceptually illustrates an example of a network system 300 for implementing some aspects of the subject disclosure. Specifically, the network system 300 comprises user devices 302, 304 and 306, server 310 and network 308. As illustrated, user devices 302, 304 and 306 and server 310 are communicatively connected via network 308. It is understood that in addition to user devices 302, 304, 306 and server 310, any number of devices could be communicatively connected to network 308. Furthermore, network 308 can comprise multiple networks, such as a publicly operated telephone system, a wireless telephone network or a network of networks, e.g., the Internet.

In some examples, one or more of the process steps of the subject technology can be carried out by one or more of user devices 302, 304 and 306 and server 310, over network 308. In one example, server 310 hosts a social networking service that is provided to one or more users or networking associates via network 308. Furthermore server 310 can be configured to perform processing necessary to carry out steps of the subject technology, including aggregating privacy setting information for one or more networking associates (e.g., users associated with user devices 304 and 306) and to generate statistical data and/or privacy setting recommendations based on the aggregated privacy setting information.

In certain aspects, server 310, either alone or in conjunction with one or more other computing devices, can be configured to provide the statistical data for display to a user (e.g., a networking associate that is associated with user device 302), in association with user configurable privacy controls. For example, server 310 can be used to provide a UI, (such as UI 100 described above with respect to FIG. 1), to one or more of the user devices 302, 304 and 306.

Figure 4:
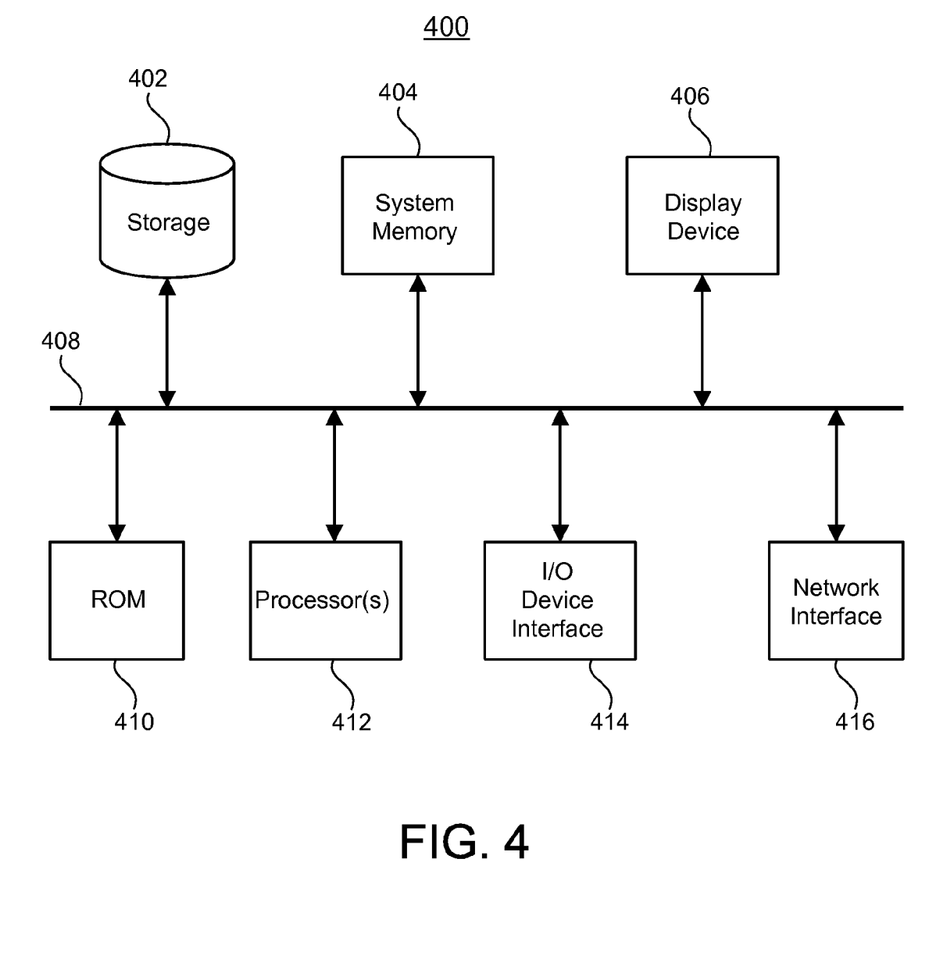
FIG. 4 illustrates an example of a computing system with which some aspects of the subject technology can be implemented.

FIG. 4 illustrates an example of a computing system 400 that can be used for executing the steps of the subject disclosure. In some examples, computing system 400 can be a single computing device such as a server (e.g., the server 310 discussed above), or the computing system can be a computing device such as a user device (e.g., one of user devices 302, 304 or 306, discussed above). Furthermore, in some implementations, the computing system 400 can be operated alone or together with one or more other electronic systems e.g., as part of a cluster or a network of computers.

As illustrated, the computing system 400 comprises storage 402, a system memory 404, an output device interface 406, system bus 408, ROM 410, one or more processor(s) 412, input/output device interface 414 and a network interface 416. In some aspects, the system bus 408 collectively represents all system, peripheral, and chipset buses that communicatively connect the numerous internal devices of the electronic system 400. For instance, system bus 408 communicatively connects the processor(s) 412 with the ROM 410, the system memory 404, the output device interface 406 and the permanent storage device 402.

In some implementations, the various memory units, the processor(s) 412 retrieve instructions to execute (and data to process) in order to execute the steps of the subject technology. For example, the processor(s) 412 can be configured to perform operations for aggregating privacy setting information for one or more networking associates, generating statistical data based on the aggregated privacy setting information and providing the statistical data for display to a user, in association with user configurable privacy controls. In certain aspects, processor(s) 412 can be further configured for comparing a profile of the user with one or more profiles of the one or more networking associates and displaying a privacy setting recommendation to the user based on the comparison of the user's profile with the profiles of the one or more networking associates.

The processor(s) 412 can be a single processor or a multi-core processor in different implementations. Additionally, processor(s) 412 can comprise one or more graphics processing units (GPUs) and/or one or more decoders, depending on implementation. The ROM 410 stores static data and instructions that are needed by the processor(s) 412 and other modules of electronic system 400. Similarly, the processor(s) 412 can comprise one or more memory locations such as a CPU cache or processor in memory (PIM), etc. The storage device 402, is a read-and-write memory device. In some aspects, this device can be a non-volatile memory unit that stores instructions and data even when electronic system 400 is without power. Some implementations of the subject disclosure can use a mass-storage device (such as solid state, magnetic or optical storage devices) e.g., a permanent storage device 402.

Other implementations can use one or more a removable storage devices (e.g., magnetic or solid state drives) such as permanent storage device 402. Although the system memory can be either volatile or non-volatile, in some examples the system memory 404 is a volatile read-and-write memory, such as a random access memory. System memory 404 can store some of the instructions and data that the processor needs at runtime.

In some implementations, the processes of the subject disclosure are stored in system memory 404, permanent storage device 402, ROM 410 and/or one or more memory locations embedded with the processor(s) 412. From these various memory units, processor(s) 412 retrieve instructions to execute and data to process in order to execute the processes of some implementations of the instant disclosure.

The bus 408 also connects to the input device interface 414 and output device interface 406. The input device interface 414 enables a user to communicate information and select commands to the electronic system 400. Input devices used with the input device interface 414 may include for example, alphanumeric keyboards and pointing devices (also called "cursor control devices") and/or wireless devices such as wireless keyboards, wireless pointing devices, etc.

Finally, as shown in FIG. 4, bus 408 also communicatively couples the electronic system 400 to a network (not shown) through a network interface 416. It should be understood that the network interface 416 can be either wired, optical or wireless and may comprise one or more antennas and transceivers. In this manner, the electronic system 400 can be a part of a network of computers, such as a local area network ("LAN"), a wide area network ("WAN"), or a network of networks, such as the Internet (e.g., the network 308, as discussed above).

In practice the methods of the subject technology can be carried out by the electronic system 400. In some aspects, instructions for performing one or more of the method steps of the present disclosure will be stored on one or more memory devices such as the storage 402 and/or the system memory 404.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method comprising:
   aggregating privacy setting information for a plurality of networking associates;
   generating data based on the aggregated privacy setting information, the data comprising a first number of first networking associates of the plurality of networking associates that made a first selection with respect to a privacy setting and a second number of second networking associates of the plurality of networking associates that made a second selection different than the first selection with respect to the privacy setting;
   providing for display a graphical representation indicating the first number of first networking associates relative to the second number of second networking associates with respect to the privacy setting, the graphical representation being displayed in association with user configurable privacy controls of the privacy setting; and
   providing a privacy setting recommendation for display to a user based on the generated data,
   wherein the plurality of networking associates comprises a minimum number of networking associates to obscure the selected privacy setting of any individual networking associate of the plurality of networking associates.

2. The method of claim 1, wherein the data comprises statistical data, and
   wherein providing the privacy setting recommendation further comprises displaying the statistical data to the user based on detecting changes in privacy settings of the user.

3. The method of claim 1, wherein the privacy setting recommendation comprises an indication of privacy settings selected by at least one of the plurality of networking associates.

4. The method of claim 2, wherein generating the statistical data is further based on a comparison of a profile of the user with one or more profiles of the plurality of networking associates.

5. The method of claim 1, wherein the plurality of networking associates are social networking contacts of the user.

6. The method of claim 1, wherein the plurality of networking associates share common demographic information with the user.

7. The method of claim 2, wherein providing the statistical data for display to the user is based on a relationship between the user and at least one of the plurality of networking associates.

8. A system comprising:
   one or more processors; and
   a computer-readable medium comprising instructions stored therein, which when executed by the processors, cause the processors to perform operations comprising:
   aggregating privacy setting information for a plurality of networking associates;
   generating statistical data based on the aggregated privacy setting information, the statistical data comprising a first number of first networking associates of the plurality of networking associates that made a first selection with respect to a privacy setting and a second number of second networking associates of the plurality of networking associates that made a second selection different than the first selection with respect to the privacy setting;
   providing the statistical data for display to a user, in association with user configurable privacy controls of the privacy setting, the statistical data including a graphical representation indicating the first number of first networking associates relative to the second number of second networking associates with respect to the privacy setting; and
   providing a privacy setting recommendation for display to the user based on the statistical data, wherein the plurality of networking associates comprises a minimum number of networking associates to obscure the selected privacy setting of any individual networking associate of the plurality of networking associates.

9. The system of claim 8, wherein generating the statistical data is further based on a comparison of a profile of the user with one or more profiles of the plurality of networking associates.

10. The system of claim 8, wherein the plurality of networking associates are social networking contacts of the user.

11. The system of claim 8, wherein the plurality of networking associates share common demographic information with the user.

12. The system of claim 8, wherein providing the statistical data for display to the user is based on a relationship between the user and at least one of the plurality of networking associates, and the statistical data is provided for display only at particular times in relation to user tasks.

13. A non-transitory computer-readable storage medium comprising instructions stored thereon, which when executed by a processor, cause the processor to perform operations comprising:
aggregating privacy setting information for a plurality of networking associates;
generating data based on the aggregated privacy setting information, the data comprising a first number of first networking associates of the plurality of networking associates that made a first selection with respect to a privacy setting and a second number of second networking associates of the plurality of networking associates that made a second selection different than the first selection with respect to the privacy setting; and
providing the data for display to a user, in association with user configurable privacy controls of the privacy setting, the data including a graphical representation indicating the first number of first networking associates relative to the second number of second networking associates with respect to the privacy setting,
wherein the data comprises a privacy setting recommendation for the user,
wherein the plurality of networking associates comprises a minimum number of networking associates to obscure the selected privacy setting of any individual networking associate of the plurality of networking associates.

14. The non-transitory computer-readable storage medium of claim 13, wherein the privacy setting recommendation comprises an indication of privacy settings selected by at least one of the plurality of networking associates.

15. The non-transitory computer-readable storage medium of claim 13, wherein generating the data is further based on a comparison of privacy settings selected by a subset of the plurality of networking associates with privacy settings selected by another subset of the plurality of networking associates.

16. The non-transitory computer-readable storage medium of claim 13, wherein the plurality of networking associates are social networking contacts of the user.

17. The non-transitory computer-readable storage medium of claim 13, wherein the plurality of networking associates share common demographic information with the user.

18. The non-transitory computer-readable storage medium of claim 13, wherein providing the data for display to the user is based on a relationship between the user and at least one of the plurality of networking associates.

19. The non-transitory computer-readable storage medium of claim 13, wherein the privacy setting recommendation is displayed proximate to one or more of the user configurable privacy controls.

* * * * *